(12) United States Patent
Laughlin et al.

(10) Patent No.: US 9,904,356 B2
(45) Date of Patent: Feb. 27, 2018

(54) TRACKING A USER TO SUPPORT TASKS PERFORMED ON COMPLEX-SYSTEM COMPONENTS

(71) Applicant: The Boeing Company, Seal Beach, CA (US)

(72) Inventors: Brian Dale Laughlin, Wichita, KS (US); Richard N. Blair, Kent, WA (US); William David Kelsey, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 445 days.

(21) Appl. No.: 13/903,252

(22) Filed: May 28, 2013

(65) Prior Publication Data

US 2014/0354529 A1 Dec. 4, 2014

(51) Int. Cl.
*G06F 3/01* (2006.01)
(52) U.S. Cl.
CPC .............. *G06F 3/011* (2013.01); *G06F 3/017* (2013.01)
(58) Field of Classification Search
None
See application file for complete search history.

(56) References Cited

U.S. PATENT DOCUMENTS

| | | | |
|---|---|---|---|
| 2004/0189675 A1* | 9/2004 | Pretlove | B25J 9/1656 345/633 |
| 2011/0137464 A1* | 6/2011 | Sabater Navarro | A61H 1/0274 700/264 |
| 2012/0056989 A1* | 3/2012 | Izumi | H04N 13/0014 348/46 |

OTHER PUBLICATIONS

International Search Report and Written Opinion dated Aug. 7, 2014 for PCT/US2014/035609, 10 pages.
International Search Report and Written Opinion dated Aug. 8, 2014 for PCT/US2014/035607, 10 pages.
European Search Report dated Aug. 8, 2014 for European Application No. 14 165 989.6, 6 pages.
Canadian Examination Report dated Nov. 2, 2015 for Application No. 2,847,398.
Canadian Examination Report dated Dec. 13, 2016 for Application No. 2,847,398.

* cited by examiner

*Primary Examiner* — Jennifer Mehmood
*Assistant Examiner* — Parul Gupta
(74) *Attorney, Agent, or Firm* — Womble Bond Dickinson (US) LLP

(57) ABSTRACT

A system is provided that includes sensors(s) configured to provide sensed input including measurements of motion and/or orientation of a user during performance of a task to work a complex-system component. The system includes a front-end system configured to process the sensed input including the measurements to identify a known pattern that indicates a significance of the sensed input from which to identify operations of an electronic resource. The front-end system is configured to form and communicate an input to cause the electronic resource to perform the operations and produce an output. The operations include determination of an action of the user during performance of the task, or calculation of a process variable related to performance of the task, from the measurements. And the front-end system is configured to receive the output from the electronic resource, and communicate the output to a display device, audio output device or haptic sensor.

18 Claims, 6 Drawing Sheets

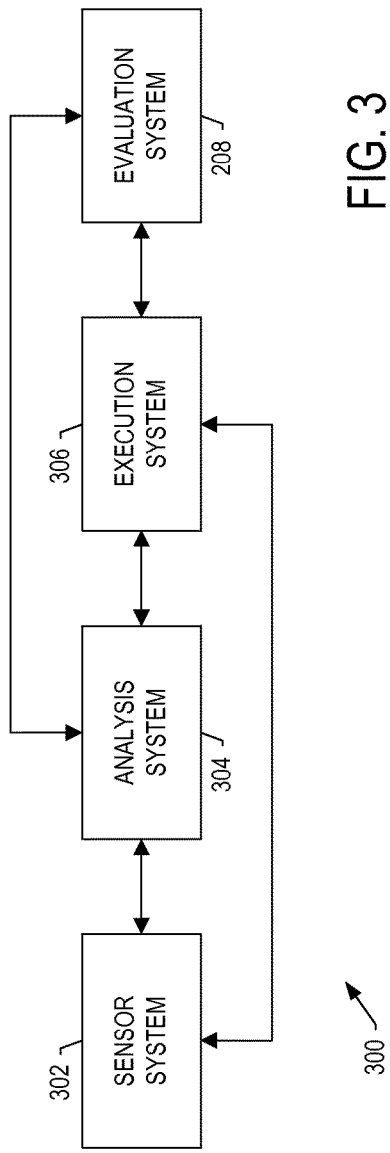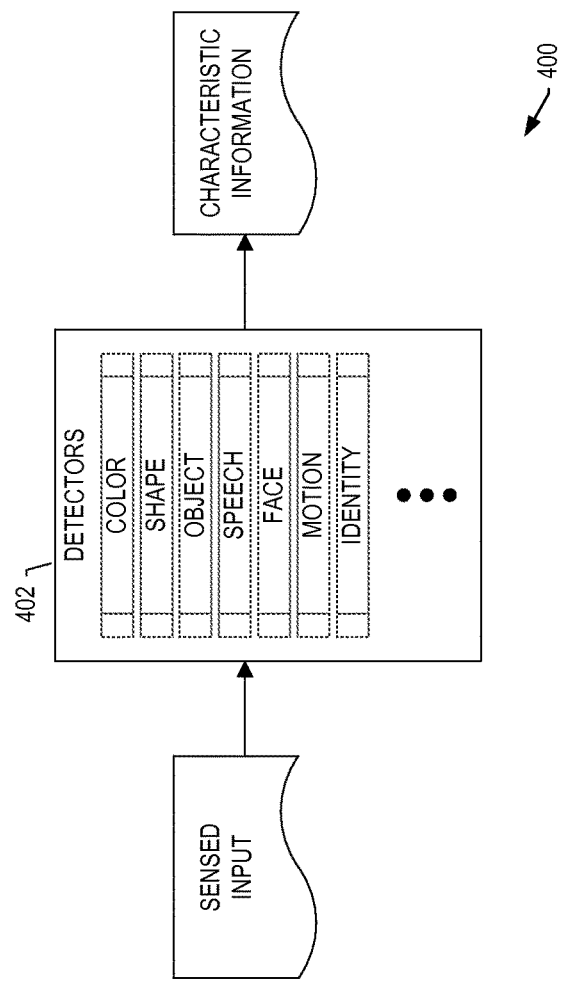

TRACKING A USER TO SUPPORT TASKS PERFORMED ON COMPLEX-SYSTEM COMPONENTS

TECHNOLOGICAL FIELD

The present disclosure relates generally to the performance of tasks and, in particular, to tracking a user to support the performance of tasks on components of a complex system.

BACKGROUND

Many modern complex systems such as aircraft are generally composed of components, subsystems and the like. Each subsystem is composed of respective parts, and each part includes respective features. The parts of the complex system may be assembled into a number of subsystems, which in turn may be assembled into the complex system. In the context of an aircraft, one or more parts or subsystems may be designed as a modular component of the aircraft often referred to as a line-replaceable unit (LRU), of which a single aircraft may include a number of LRUs and other parts or subsystems.

Work on a complex system often includes pre-production, production and post-production activities performed by a number of workers including technicians, mechanics and the like. During production or post-production of the complex system, for example, workers may perform a number of activities such as build, repair and/or maintenance activities. In various examples, these and similar activities may be performed according to a work plan that formalizes instruction for building, creating or otherwise completing requirements or intention of an engineering design of the aircraft or components of the aircraft. The engineering design may include a set of requirements that indicate specifications, tolerances, purposes, materials or other aspects of the aircraft. The work plan may include a series of work instructions that together comprise a set of directives to be accomplished by workers, and each work instruction may include one or more work tasks, some of which may have their own process requirements.

Many complex systems require a precision environment to satisfy the requirements of an engineering design, which has historically required workers to use a full complement of tools, some quite specialized and some requiring expensive, recurring calibration. This often results in work environments cluttered with expensive tools and respective calibration papers, and reduced throughput for tools that must migrate through a queue of scheduled tasks.

Therefore, it may be desirable to have a system and method that takes into account at least some of the issues discussed above, as well as possibly other issues.

BRIEF SUMMARY

Example implementations of the present invention are generally directed to a system and method for tracking a user such as a worker to support tasks performed on components of a complex system. The system and method of example implementations bring a worker and their environment together to accomplish tasks. In some examples, the system and method enable the worker to use less-expensive, more-common tools and instrumentation to accomplish task objectives.

In accordance with example implementations, a worker may perform a task on a complex-system part in their environment. The system and method of example implementations integrate sensor systems, mobile computing and networked systems to sense the worker, their environment and/or their interaction with their environment. The system and method may then interact with one or more electronic resources based on the user, environment or interaction to support the same or another worker performing the same or another task.

In some examples, the system and method may further provide a new user interface that leverages an intuitive and natural interaction model and interactive modalities, and which at times may be referred to herein as a ubiquitous natural user (UNU) system. The UNU system of example implementations may form part of an augmented reality system that includes a personal display system such as augmented reality (AR) glasses including a display device, which may enable hands-free interaction and collaborative information sharing. In some examples, the UNU system may employ other active or passive personal display systems.

According to one aspect of example implementations, a user may be tasked to perform a task to work a complex-system component, such as an aircraft component. The UNU system includes one or more sensors configured to provide sensed input including measurements of motion and/or orientation of a user during performance of the task. The UNU system also includes a front-end system coupled to the sensor(s), and configured to receive and process the sensed input including the measurements to identify a known pattern that indicates a significance of the sensed input from which to identify operations of an electronic resource.

The front-end system is configured to form and communicate an input to cause the electronic resource to perform the operations and produce an output. The operations include determination of an action of the user during performance of the task, or calculation of a process variable related to performance of the task, from the measurements. And the front-end system is configured to receive the output from the electronic resource, and communicate the output to a display device, audio output device or haptic sensor.

In one example, the task has a task definition that includes or implies a defined action of the user. In this example, the front-end system may be configured to form and communicate the input to cause the electronic resource to perform the operations including determination of the action of the user, and further including comparison of the determined action to the defined action, and determination of compliance of performance of the task with the task definition based on the comparison. Also in this example, the front-end system may be configured to receive and communicate an indication of the compliance.

In one example, the front-end system may be configured to form and communicate the input or another input to cause the electronic resource or another electronic resource to perform or facilitate performance of an ergonomic risk assessment based on the sensed input.

In one example, the task has a task definition that specifies a process requirement for the process variable that includes a torque, swag force or preload applied to a fastener during performance of the task including installation of the fastener on the complex-system component. In this example, the front-end system may be configured to form and communicate the input to cause the electronic resource to perform the operations including calculation of the process variable, and further including comparison of the calculated process variable to the specified process requirement, and determination of compliance of the calculated performance variable with the specified process requirement based on the comparison. Also in this example, the front-end system may be configured to receive and communicate an indication of the compliance.

In a further example, the sensor(s) may include a muscle-activity sensor configured to provide measurements of muscle activity of the user during performance of the task. In this further example, the front-end system may be configured to form and communicate the input to cause the electronic resource to perform the operations including calculation of the process variable from the measurements of muscle activity.

In a further example, the front-end system may be configured to receive and communicate a visual cue, audible feedback or haptic feedback to alert the user that the calculated process variable is compliant with the specified process requirement.

In one example, the front-end system may be configured to communicate the output for display by a personal display system that includes the display device. In this example, the personal display system may be configured to generate or enable a live or direct view of the environment, augmented by the output displayed by the display device.

In other aspects of example implementations, an improved method and computer-readable storage medium are provided for tracking a user to support tasks performed on components of a complex system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

FIG. 3 is an illustration of a front-end system in accordance with an example implementation;

FIGS. 4, 5, 6 and 7 illustrate a sensor system, analysis system, execution system and evaluation system, respectively, in accordance with an example implementation;

DETAILED DESCRIPTION

Figure 1:
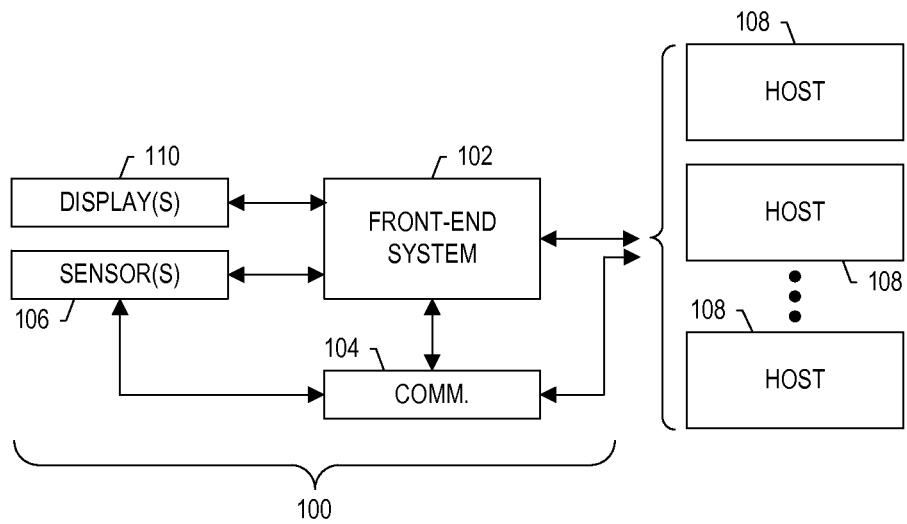
FIG. 1 is an illustration of an ubiquitous natural user (UNU) system in accordance with an example implementation.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present invention relate generally to a ubiquitous natural user (UNU) system for interacting with one or more electronic resources. Some example implementations may relate generally to system and method for tracking a user (e.g., worker) to support tasks performed on components of a complex system, and may be further integrated with a UNU system. The UNU system may be generally configured to sense a user, the user's environment and/or the user's interaction with their environment. Information characteristic of the user, environment or interaction may be analyzed to identify one or more operations that one or more electronic resources may be caused to perform to thereby interact with the respective resources. The operations(s) may be executed and may be fed back to prior analysis for further evaluation in order to improve future results and provide timely information for any required or otherwise desired operational changes.

FIG. 1 illustrates a UNU system 100 according to example implementations of the present disclosure. The UNU system may include, for example, a front-end system 102 connected or otherwise coupled to one or more interfaces for transmitting, receiving and/or outputting information. The interfaces may include one or more communications interfaces 104, sensors 106 and/or user interfaces. The communications interface may be configured to transmit and/or receive information, such as to and/or from other elements of the UNU system, one or more resource host systems 108 and the like.

The communications interface 104 may be configured to transmit and/or receive information by physical (wired), and/or wireless communications links. These wireless communication links in particular may be configured to implement any of a number of different radio access technologies such as any of a number of 3GPP or 4GPP radio access technologies, UMTS UTRA, GSM radio access technologies, CDMA 2000 radio access technologies, WLANs (e.g., IEEE 802.xx, e.g., 802.11a, 802.11b, 802.11g, 802.11n), WiMAX, IEEE 802.16, wireless PANs (WPANs) (e.g., IEEE 802.15, Bluetooth®, low power versions of Bluetooth®, IrDA, UWB, Wibree, Zigbee®), near-field communication technologies, and the like.

The front-end system 102 may also be coupled to one or more sensors 106 configured to provide sensed input to the UNU system 100. The sensors, and in some examples the communications interface 104, may generally provide input necessary for the front-end system to detect, recognize and drive the display of a natural user interface for interaction with various electronic resources. Natural user interfaces may remove extraneous devices and input modalities, and may allow geo-temporally and task salient interactions tailored to the role (or clearance level) and purview of the user.

The sensors 106 may include onboard sensors, off-board sensors, sensor concentrators, sensor aggregators and the like. Examples of suitable types of sensors include user physiological-condition sensors, user action-tracking sensors, user cognition-tracking sensors, environmental-condition sensors, environmental-tracking sensors and the like.

Examples of suitable user physiological-condition sensors include temperature sensors (e.g., thermometers, thermocouples), heart rate sensors, respiration sensors, perspiration sensors, muscle-activity (e.g., EMG—electromyography, MMG—mechanomyography) sensors, strain sensors, blood pressure sensors and the like. Other examples of suitable physiological-condition sensors include image sensors such as cameras (e.g., digital camera, infrared camera, thermal camera, depth-aware or range camera, stereo camera), audio sensors (e.g., microphones) and the like. Examples of suitable user action-tracking sensors include position sensors (e.g., GPS, inertial navigation, Wi-Fi-based positioning, RFID-based positioning), motion sensors (e.g., accelerometers), orientation sensors (e.g., gyroscopes, compasses, magnetometers), inertial measurement units (IMUs), pressure sensors, muscle-activity sensors and the like. Other examples of suitable user action-tracking sensors include image sensors (e.g., cameras), audio sensors and the like. Examples of suitable user cognition-tracking sensors include attention sensors, focus sensors and the like, at least some of which may include one or more sensors for a set of user actions that may be processed according to appropriate algorithms (e.g., micro expressions, gestures, comparative motion relative to task).

Examples of suitable environmental-condition sensors include image sensors (e.g., cameras), audio sensors, position sensors, clocks, calendars, temperature sensors, humidity sensors, light sensors, distance/depth sensors, three-dimensional (3D) scanners, laser measurement sensors and the like. Examples of suitable environmental-tracking sensors include image sensors, audio sensors, calendars, clocks, light sensors and the like. Notably, an example of one type of sensor 106 may be equally an example of another type of sensor as various sensors may be used for different purposes. Other examples of suitable sensors include tilt sensors, landmark systems, dynamometers, telemetry sensors, fiber optic sensors and the like. Even further, in some examples, the communications interface 104 may function as a sensor for providing information from one or more electronic resources such as a local cache or backend information system.

The front-end system 102 may also be coupled to one or more user interfaces for outputting and/or inputting information, such as a display device 110, audio output device(s) such as speaker(s), headphones and the like, haptic sensor(s) configured to provide tactile feedback such as forces, vibrations or motions. The display device may be configured to present or otherwise display information to a user, and in some examples may include the display device of a wearable (e.g., head-mounted) or handheld personal display system. Examples of suitable personal display systems may include private, private-shared (linked private) or public personal display systems such as those provided in the form of eyeglasses, safety goggles, contact lenses and the like, image projectors, video projectors, any of a number of other active or passive display systems, laser pointers and the like. In other examples, the display device may include a more conventional display device such as a liquid crystal display (LCD), light-emitting diode display (LED), plasma display panel (PDP) and the like, which may or may not take the form of a personal display system (e.g., smartphone, tablet computer).

The user interfaces may also include one or more user input interfaces. These user input interfaces may be wired or wireless, and may be configured to receive information from a user into the UNU system 100, such as for processing, storage and/or display. Suitable examples of user input interfaces include a microphone, image or video capture device, keyboard or keypad, joystick, touch-sensitive surface (separate from or integrated into a touchscreen), biometric sensor and the like. Similar to the communications interface, in some examples, a user input interface may function as a sensor for providing information directly from a user.

As suggested above, the UNU system 100 of example implementations may be configured to communicate with one or more resource host systems 108, which may be configured to host electronic resources. Some examples of host systems may be remote from the UNU system such as across one or more networks, while other examples of host systems may be local to the UNU system. The electronic resources may vary depending on application of the UNU system, although examples of suitable electronic resources may generally include software-based systems. In some examples, the resource host system may include an appropriate storage accessible by an electronic resource, such as file storage, database storage, cloud storage and the like.

Examples of suitable software-based systems (electronic resources) include information systems, building management systems, computer-aided design (CAD) systems and the like. Examples of suitable information systems may include transaction processing systems, office systems, decision support systems, knowledge management systems, database management systems, office information systems. Other examples of suitable information systems may include data warehouses, resource planning systems, enterprise systems, expert systems, search engines, geographic information systems, global information systems, office automation systems and the like.

The resource host system(s) 108 are shown separate from the UNU system 100, but in various examples, the UNU system may include one or more resource host systems. Likewise, while the sensors 106 and display device 110 are shown as part of the UNU system, one or more sensors and/or display devices may be separate from but in communication with the UNU system, such as in the case of one or more off-board sensors.

Figure 2:
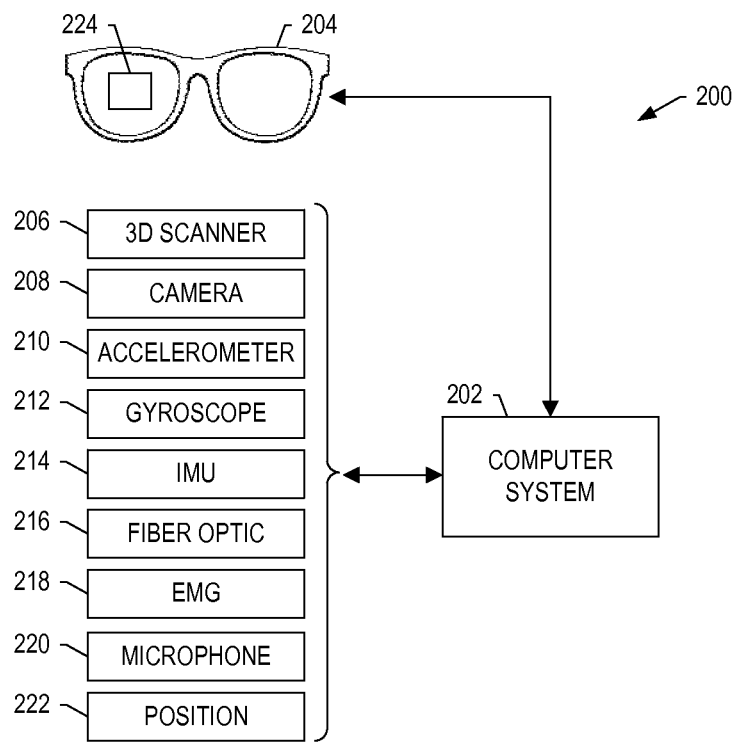
FIG. 2 is an illustration of one example implementation of the UNU system in the form of an augmented reality system.

FIG. 2 is an illustration of one example implementation of the UNU system 200 in the form of an augmented reality system. As shown, the UNU system may include a computer system 202, which in some examples may be configured to implement the front-end system 102 and communication interface 104 of the UNU system 100 of FIG. 1. In some examples, the computer system may comprise, include or be embodied in a portable, hardware-based electronic device such as a smartphone, tablet computer and the like. The computer system may be coupled (by wire or wirelessly) to one or more wearable (e.g., head-mounted) or handheld personal display systems. In some examples, the personal display system may take the form of augmented reality (AR) eyeglasses, safety goggles, contact lenses and the like (generally AR glasses 204), which may be wearable by a user in an environment. In some examples, the UNU system may be integrated into the AR glasses.

The computer system 202 and/or AR glasses 204 (or other personal display system) may be equipped with or coupled (by wire or wirelessly) to one or more sensors (e.g., sensors 106) configured to provide sensed input to the computer system. As suggested above, for example, the sensors may include an environmental-condition sensor such as a 3D scanner 206 configured to scan the user's environment and provide measurements of points on the surfaces of objects in the environment. These measurements may be used for a number of different purposes, such as to generate a point cloud or other 3D model of the user's environment.

The sensors may also include one or more cameras 208 that may be configured as a user action-tracking sensor and/or environmental-condition sensor. The camera(s) may be configured to capture images or videos of the user and/or their physical, real-world environment; and in some instances, the camera(s) may thereby capture gestures of the user. In some examples, the sensors may include other user action-tracking sensors that in some instances may be configured to capture gestures of the user, according to any of a number of suitable gesture recognition techniques. Examples of suitable sensors include one or more accelerometers 210 (motion sensors), gyroscopes 212 (orientation sensors), IMUs 214, fiber-optic sensors 216, muscle-activity (e.g., EMG) sensors 218 and the like. Additionally or alternatively, for example, the sensors may include an audio sensor such as a microphone 220 configured to capture audio such as voice commands from the user.

The sensors may take a number of different forms, and in some examples may be user wearable such as on the user's finger, wrist, arm, ankle, leg, waist or torso. In some examples, the AR glasses 204 may be equipped with the 3D scanner 206 and camera(s) 208, which may enable the 3D scanner and camera(s) to provide measurements and images/video from the user's viewpoint. In some examples, the AR glasses and/or computer system 202 may be equipped with various accelerometer(s) 210, gyroscope(s) 212, IMU(s) 214 and/or microphone 220. In some examples, the computer system may be coupled to a wired glove, armband or other user-wearable device or system equipped with various accelerometer(s), gyroscope(s), IMU(s), fiber-optic sensor(s) 216 and/or muscle-activity (e.g., EMG) sensor(s) 218. One example of a suitable wired glove is 5DT Data Glove Ultra by Fifth Dimension Technologies. And one example of a suitable armband is the MYO gesture-control armband by Thalmic Labs Inc.

In some examples, the camera 208 and/or microphone 220 may be configured as physiological-condition sensors configured to provide images/video and/or audio of a user. Or the computer system 202 and/or AR glasses 204 may be equipped with or coupled (by wire or wirelessly) to one or more other physiological-condition sensors configured to provide sensed input characteristic of the user. This sensed input in various examples may permit recognition of the user.

In some examples, the computer system 202 and/or AR glasses 204 may be equipped with or coupled (by wire or wirelessly) to one or more position sensors 222 configured to provide measurements of the position of the user. As indicated above, examples of suitable position sensors include those supporting GPS, inertial navigation, Wi-Fi-based positioning, RFID-based positioning or the like.

The AR glasses 204 (or other personal display system) may generate or otherwise enable a live or direct view of the user's environment. The AR glasses may also include a display device 224 (e.g., display device 110) for information from the computer system 202 (e.g., implementing UNU system 100), such as information output by electronic resources. In this regard, the live or direct view of the environment may be augmented by information from the computer system. In some examples, the computer system or AR glasses may further include or be otherwise configured to communicate with one or more audio output devices, haptic sensors for providing audible and/or tactile feedback. This feedback may be provided in addition to or in lieu of certain visual feedback or information by the display device.

As suggested above and explained below, information from the computer system 202 may depend on sensed input from one or more sensors 206-220, some of which may be equipped by and others of which may be coupled to the AR glasses 204 and/or computer system. In one particular example, information from the computer system may vary depending on the viewpoint of the user, which may be reflected by sensed input from a sensor such as the camera 208. In some other examples, the computer system may be coupled to a plurality of AR glasses; and in these examples, information from the computer system may vary for each of the AR glasses depending on the viewpoints of their respective users.

FIG. 3 illustrates a front-end system 300 according to one example implementation. The front-end system 300 of FIG. 3 may be one example of the front-end system 102 of the UNU system 100 of FIG. 1, and which in some examples may be implemented by the computer system 202 of the UNU system 200 of FIG. 2. The front-end system may include any of a number of different subsystems (each an individual system) for performing one or more functions or operations to carry out user interaction with one or more electronic resources. As shown, for example, the front-end system may include a sensor system 302, analysis system 304, execution system 306 and/or evaluation system 308. It should be understood that while the sensor system, analysis system, execution system and evaluation system are shown as part of the front-end system, one or more of the respective systems may instead be separate from but in communication with the front-end system or even the UNU system. Further, it should be understood that one or more of the subsystems may function or operate as a separate system without regard to others of the subsystems. And it should be understood that the UNU system may include one or more additional or alternative subsystems than those shown in FIG. 3.

As explained in greater detail below, the sensor system 302 may be generally configured to receive sensed input from one or more sensors (e.g., sensors 106), which may include information characteristic of a user, the user's environment and/or the user's interaction with their environment. The analysis system 304 may process and correlate this characteristic information to existing knowledge to identify an intent, purpose or significance of the characteristic information, and from its significance, identify one or more operations that the execution system 306 may cause one or more electronic resources to perform. The evaluation system 308 may perform requisite analysis and return feedback to improve future operations. Reference will now be made to FIGS. 4, 5, 6 and 7, which illustrate more particular examples of a suitable sensor system, analysis system, execution system and evaluation system, respectively, according to example implementations of the present disclosure.

FIG. 4 illustrates a sensor system 400 according to one example implementation. As indicated above, the sensor system 400 may be one example of the sensor system 302 of the front-end system 300 of FIG. 3. The sensor system may be configured to receive and collect sensed input from one or more sensors (e.g., sensors 106). The sensors may be generally configured to sense a user, the user's environment and/or the user's interaction with their environment; and their sensed input may be characteristic of the user, user's environment or user's interaction with their environment. In some examples, the sensor system may use various sensed input to derive information characteristic of the user, user's environment or user's interaction with their environment. As shown, then, the sensor system may include one or more detectors 402 configured to process various sensed input (individually or as a composite) according to respective detection algorithms to form a derived sensed input. Or in some examples, sensed input may be parsed into one or more derived sensed input.

The detectors 402 may receive raw sensed input, identify salient information and information sets, and provide appropriate computations, transformations and combinations. The UNU system 100 may provide an extensible means to update detectors such as through a bootstrap on startup, through a need-based dynamic reconfiguration process (based on several factors such as device power, potential for tracking items of interested and context), and/or through direct operator selection. In some examples, sensed input from more than one sensor may be used to implement a detector or to improve the performance of a detector. An example of the latter may be the use of an aircraft readiness list (ARL) for a contextually-relevant aircraft, as well as sensed radio frequency identification (RFID) and object character recognition (OCR) for line-replaceable unit (LRU) while in an aircraft electrical equipment (EE) bay to detect an object (LRU) and retrieve context-relevant information.

As shown in FIG. 4, examples of suitable detectors 402 may include a color detector, shape detector, object detector, speech detector (e.g., language/dialect detection, mood detection, stress detection, engagement detection), face detection (e.g., expression detection, mood detection, stress detection, engagement detection). Examples of suitable detectors may also include a motion detector, identity detector, and/or one or more other detectors such as a feature detector, human characterizer and the like. In this regard, human characterization may include, for example, role characterization, geographic and/or temporal localization, language/dialect characterization, stress level (e.g., correlation to measurable factors, historical information), engagement detection (e.g., correlation to measurable factors, historical information), and the like.

The sensed input including that received (raw sensed input) and any derived (processed sensed input) by the sensor system 400 may include information characteristic of the user, user's environment or user's interaction with their environment. And the sensor system may pass this characteristic information to other subsystems of the front-end system such as for analysis, evaluation or the like.

Figure 5:
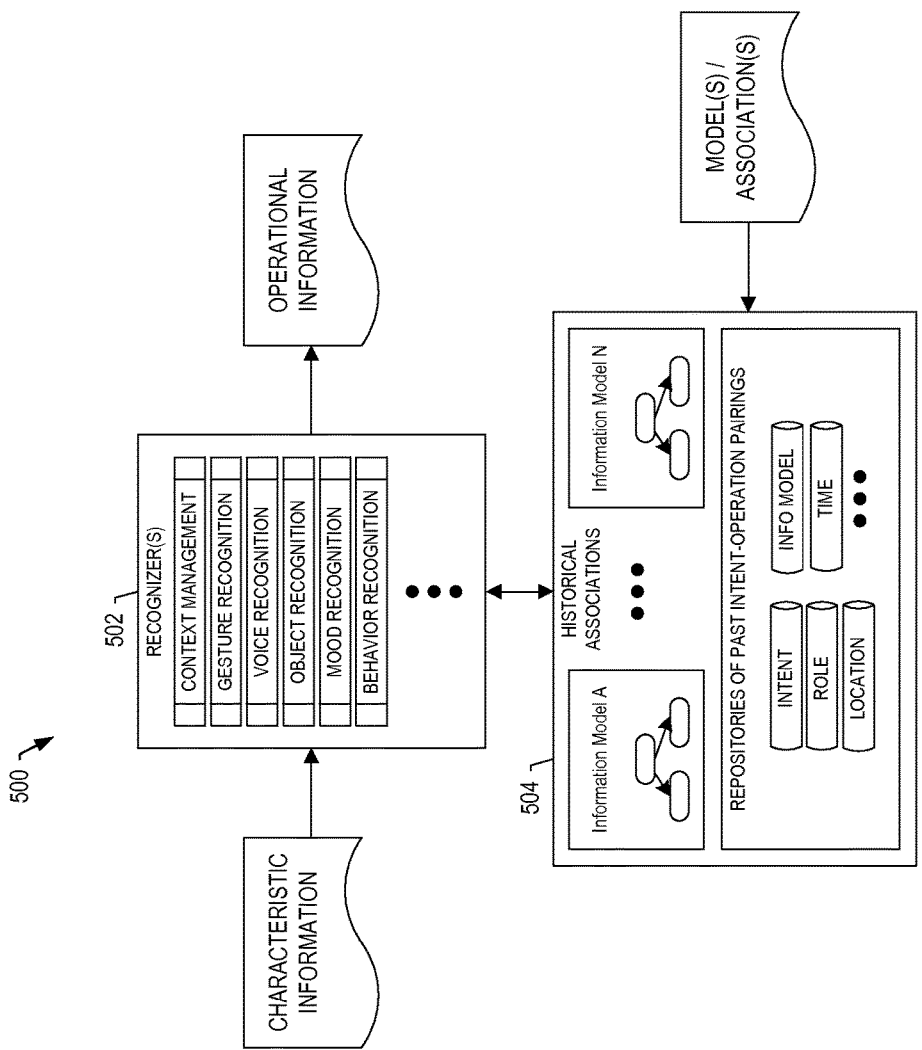

FIG. 5 illustrates an analysis system 500 according to one example implementation, and which may be one example of the analysis system 304 of the front-end system 300 of FIG. 3. The analysis system may be generally configured to receive characteristic information (e.g., raw sensed input, process sensed input) and continuously track and correlate the respective information to identify its significance (intent), and from its significance, operation(s) of electronic resource(s). For example, the analysis system may employ object recognition and tracking to identify components on an aircraft, which may then be used to provide a dynamically-generated user interface allowing the user to interact with a component within 3D space (plus time), or identify an item of interest in the field of view relative to the user's task.

As shown, the analysis system 500 may include a number of recognizers 502 coupled to a persistence store 504 of information models and/or historical intent-operation associations. The recognizers may be configured to receive and process characteristic information according to respective intent algorithms to identify one or more known patterns, which may indicate the significance (intent) of the characteristic information. In some examples, one or more recognizers may process characteristic information using appropriate information models from the persistence store.

Patterns identified by the analysis system 500 may include those universally-applied (e.g., human-hand object, car object, stop gesture), domain-dependent (e.g. replace 737NG landing gear light, stop special operations force gesture, stop taxing airplane gesture) and/or user-specific (e.g. scheduled break, opportunistic electronic data transfer, special tools required for disability, user's task sheet). In some examples, various recognizers 502 may be interdependent. In these examples, interdependencies between recognizers may be context sensitive such as in instances in which geographical and/or temporal constraints in conjunction with one or more recognizers influence results. As shown, examples of suitable recognizers include context management, gesture recognition, voice recognition (e.g., text-to-speech), object recognition, mood recognition and/or behavior recognition. Other examples of suitable recognizers include point-cloud recognition, fatigue recognition, focus recognition, user orientation, tool orientation, object tracking, applied force tracking, task tracking and/or various identifiers (e.g., voice print, fingerprint, heat signature, facial recognition).

As a more particular example, consider a recognizer 502 for gesture recognition (gesture recognizer). The gesture recognizer may be configured to recognize object (e.g., hand) movement within defined 3D geometric zones (e.g., width, length, height) within the user's physical environment. A rectangular cuboid zone may be defined to implement a virtual keyboard on a desk, a square cuboid zone spatially located above the rectangular cuboid may be defined to accept other gestures, and a sphere spatially located to the right of the rectangular cuboid may be defined to more directly interface with a building management system to control building lighting. Each zone may be defined in a number of different manners such as by a width, length and height that may be expressed in typical coordinates (e.g., x, y, z), but a zone may also include additional parameters such as date, time, geographic coordinate and the like such as to create situational or context-sensitive user interface (UI) tailoring.

The persistence store 504 may include storage for one or more information models, past intent-operation pairings, and/or other information according to which characteristic information may be processed. The persistence store may provide a historical record of approach and success criteria, weighted performance metrics by individual and/or role and perhaps also categorized by relevant factors (e.g. location, time, availability of equipment, etc.). In one example, information stored by the persistence store may be maintained by an evaluation system, such as the evaluation system 308 of FIG. 3. Combined with the recognizers 502, the persistence store may provide a means to track, gauge and improve performance of the front-end system, and thereby the UNU system.

In a more particular example, characteristic information (e.g., raw sensed input, process sensed input) processed by the recognizers 502 and the significance identified from the characteristic information may be condensed in a binary form to characteristic-intent pair (CIP). The CIP may be correlated with operation(s) of electronic resource(s) to form a correlated operation-CIP pair (OCIP), which in one example may correspond to an intent-operation pairing stored by the persistence store 504. In accordance with example implementations, one or more OCIPs form a unique fingerprint for a sequence of functions ranging from detection, to recognition, to operation and so forth. And in some examples, this fingerprint and/or one or more of its OCIP(s) may be weighted based on one or more performance metrics by individual and/or role and perhaps also categorized by relevant factors (e.g. location, time, availability of equipment, etc.).

The recognizers 502 may compare the identified significance to the persistence store 504 for historical significance and associated operations based on one or more intent-operation pairings (e.g., one or more OCIPs that form a unique fingerprint). In one example, each recognizer may be configured to compare operations and produce a weighted evaluation based on identification, operation proposal and perhaps other weightings (e.g., user, role). The analysis system 500 may then pass operational information including the analysis, options, results and/other user feedback (e.g., auditory, visual, touch) to other subsystems of the front-end system such as for execution of one or more operations by one or more electronic resources, and presentation of any corresponding output from the electronic resource(s).

Figure 6:
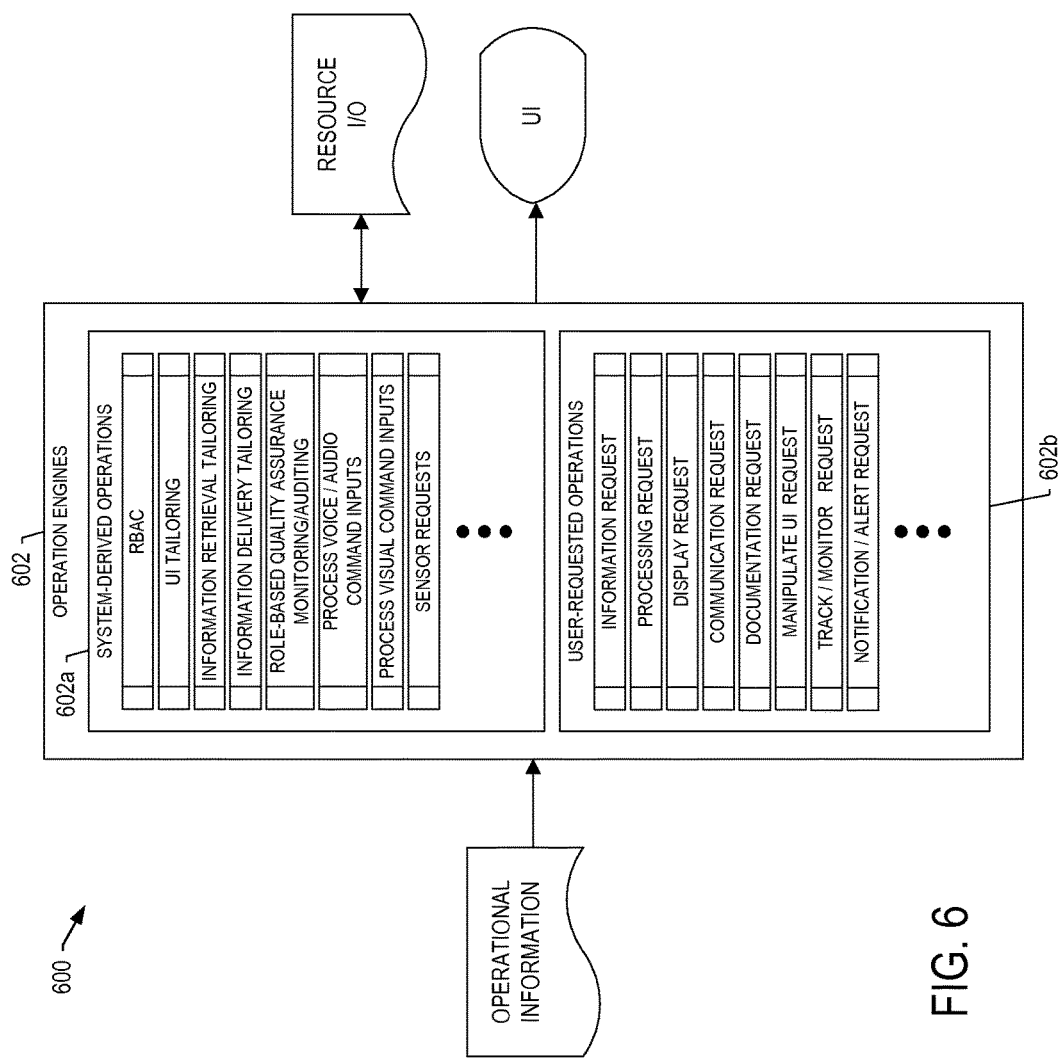

FIG. 6 illustrates an execution system 600 according to one example implementation, and which may be one example of the execution system 306 of the front-end system 300 of FIG. 3. The execution system may be generally configured to receive operational information and cause one or more electronic resources to perform one or more operations based thereon. In various examples, the execution system may cause performance of operation(s) based on characteristic information (raw sensed input, processed sensed input), prior success patterns, algorithmic operations and the like. Operations may be dependent upon multiple factors such as context, need, urgency, compute capacity, battery life and the like.

The execution system may include a number of operation engines 602 each of which may be configured to process operational information according to a respective algorithm to form an input to one or more electronic resources to cause the respective resource(s) to perform one or more operations. In various examples, the operation engines may include those for system-derived operations 602a and/or user-requested operations 602b, although in various instances a system-derived operation may instead be user-requested, or a user-requested operation may instead be system-generated.

The system-derived operation engines 602a may be generally configured to cause performance of operations associated with significance (intent) identified from characteristic information, such as by the analysis system 304. User-requested operation engines 602b, on the other hand, may be generally configured to cause performance of operations specifically requested by the user. As shown, examples of suitable system-derived operations include role-based access control (RBAC), tailoring a UI, tailoring information retrieval, tailoring information delivery and the like. Examples of system-derived operations may also include role-based quality assurance monitoring/auditing, audio input processing (e.g., voice command), visual input processing (e.g., gestures, 3D spatiotemporal processing), movement (or motion) input processing (e.g., gestures), sensor requests and the like. Other examples of system-derived operations include automated recording (e.g., quality control, system record), system calibration, virtual audio/visual assistant, quality assurance (QA) recording, context tracking refinement and the like.

Examples of user-requested operations include a request for information, processing, display, communication, documentation and the like. Examples of user-requested operations may also include a request for UI manipulation, a request to track/monitor an object, a request for a notification/alert, and the like. Other examples of user-requested operations include actuator calibration, record audio/video, record still images, establish virtual audio/visual connection, record applied fastener torque, playback recording and the like.

The input formed by an operation engine 602 may be communicated to an appropriate electronic resource hosted by a respective local or remote resource host system 108 to cause performance of particular operation(s). The electronic resource may in turn produce an output from its performance of the operation(s), and return the output to the operation engine for output by the UNU system 100, such as by its display device 110, speaker, headphones or the like.

Figure 7:
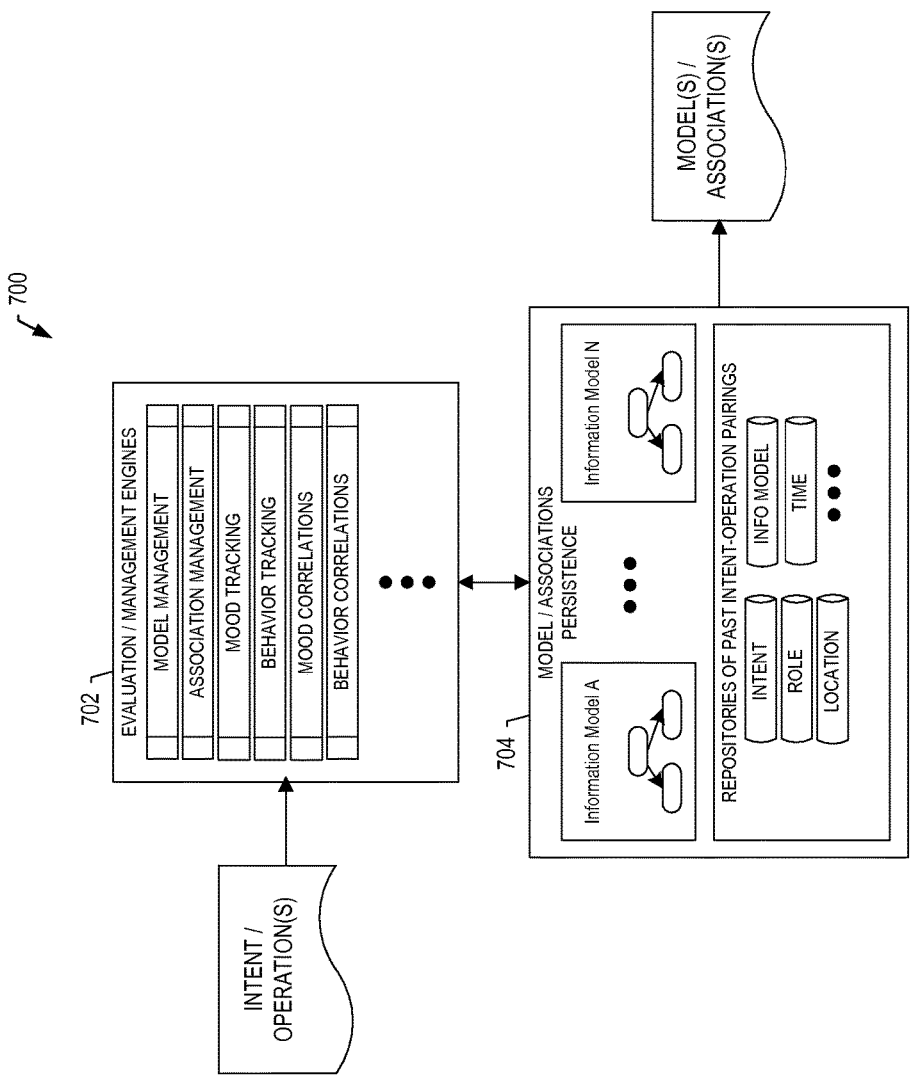

FIG. 7 illustrates an evaluation system 700 according to one example implementation, and which may be one example of the evaluation system 308 of the front-end system 300 of FIG. 3. The evaluation system may be generally configured to evaluate executed operations against success criteria associated with the operation as well as perhaps its derivation by the analysis system, which may improve performance and efficiency of future results. As shown, the evaluation system may include a number of management/evaluation engines 702 coupled to a persistence store 704 of information models and/or historical intent-operation associations. In some examples, the persistence store 704 may correspond to or otherwise maintain information stored by the persistence store 504 of the analysis system 500. Similar to the persistence store 504 of the analysis system, then, the persistence store 704 of the evaluation system may include storage for past intent-operation pairings, and/or other information according to which characteristic information may be processed. The persistence store may provide a historical record of approach and success criteria, weighted performance metrics by individual and/or role and perhaps also categorized by relevant factors (e.g. location, time, availability of equipment, etc.).

The management/evaluation engines 702 may include management engines such as model management and association management engines configured to manage the information models and intent-operation pairings stored by the persistence store 704. The management/evaluation engines 702 may also include evaluation engines configured to track the significance (intent) of characteristic information, such as that identified by the analysis system 500. And the management/evaluation engines may include evaluation engines configured evaluate correlations between the significance and operation(s) (e.g., system-derived, user-requested) that electronic resource(s) are caused to perform based thereon, such as by the execution system 600.

As shown, examples of suitable evaluation engines of the management/evaluation engines 702 include those for tracking mood, behavior and the like, as well as those for evaluating correlations between mood, behavior and the like and operation(s) of electronic resource(s). Other examples of suitable evaluation engines include those for tracking and/or evaluating correlations for context, gestures, voice, objects, point-clouds, fatigue, focus, user orientation, tool orientation, applied force, tasks and the like. In various examples, the evaluations performed by management/evaluation engines may include production of weightings based on the aforementioned performance metric(s), and which may be applied at various instances to one or more intent-operation pairings (e.g., OCIPs) stored by the persistence store 704 to thereby improve performance and efficiency of future results.

The UNU system 100 and method of example implementations may find use in a variety of potential applications, such as in the context of a complex system such as an aircraft or any of a number of other structures. A complex system may be generally composed of systems, subsystems, assemblies, subassemblies, components and the like (each generally a "subsystem"). Each subsystem may be composed of respective parts, and each part may include respective features. The parts of the complex system may be assembled into a number of subsystems, which in turn may be assembled into the complex system. In the context of an aircraft, one or more parts or subsystems may be designed as a modular component of the aircraft often referred to as an LRU, of which a single aircraft may include a number of LRUs and other parts or subsystems. Any of the complex system itself or any of its subsystems, parts (of subsystems), features (of parts) or the like may at times be generally referred to as a "component" or "part" of the complex system.

Figure 8:
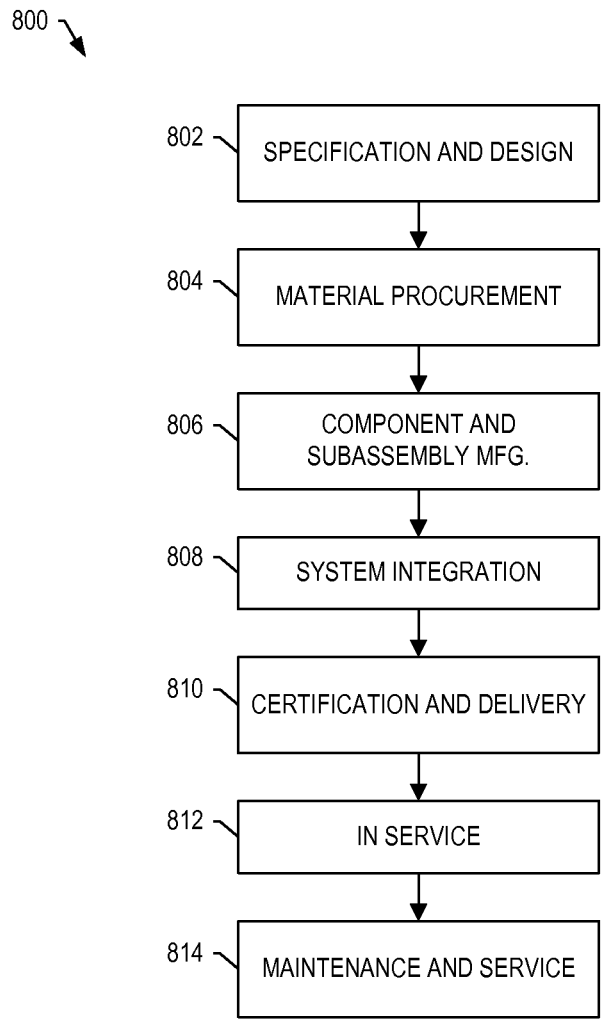
FIG. 8 is an illustration of a flow diagram of aircraft production and service methodology according to one example implementation.
Figure 9:
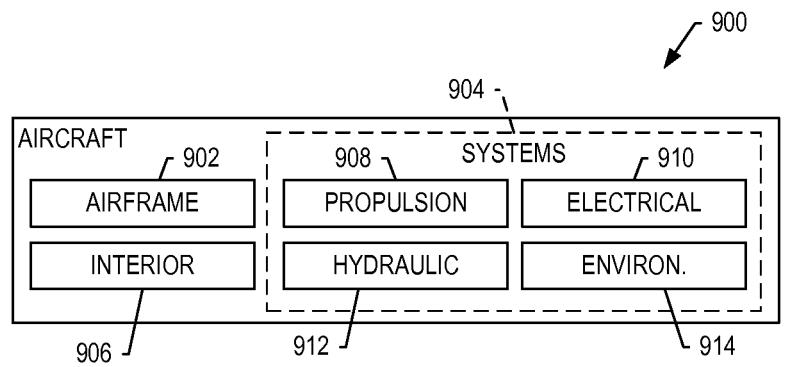
FIG. 9 is an illustration of a block diagram of an aircraft according to one example implementation.

One example of a suitable application is the support of engineering activities such as those performed during pre-production, production or post-production of a complex system such as an aircraft. Another example of a suitable application is the support of tasks such as pre-production, production or post-production tasks performed on components of a complex system. Thus, referring now to FIGS. 8 and 9, example implementations may be used in the context of an aircraft manufacturing and service method 800 as shown in FIG. 8, and an aircraft 900 as shown in FIG. 9. During pre-production, the example method may include specification and design 802 of the aircraft, manufacturing sequence and processing planning 804 and material procurement 806. During production, subsystem and component manufacturing 808 and system integration 810 of the aircraft takes place. Thereafter, during post-production, the aircraft 900 may go through certification and delivery 812 in order to be placed in service 814. While in service by a customer (also post-production), the aircraft may be scheduled for routine maintenance and service 816 (which may also include modification, reconfiguration, refurbishment or the like).

Each of the processes of the example method 800 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization and the like.

As shown in FIG. 9, an example aircraft 900 produced by the example method 800 may include an airframe 902 with a plurality of systems 904 (each a subsystem or more generally a component) and an interior 906 (including respective components). Examples of high-level systems 904 include one or more of a propulsion system 908, electrical system 910, hydraulic system 912, environmental system 914 and the like. Any number of other systems 904 may be included. Although an aerospace example is shown, the principles of the disclosure may be applied to other industries, such as the marine and automotive industries.

The UNU system 100 and method disclosed herein may be specified for use during any one or more of the stages of the example production and service method 800, including any one or more of the pre-production, production and/or post-production stages. Examples are described below in the context of the implementation of the UNU system shown and described with reference to FIG. 2, namely, in the form of the UNU system 200. It should be understood, however, that the scenarios are equally applicable to other more general or more specific implementations of the UNU system, including those with other types of personal display systems.

During pre-production or production, for example, the UNU system 200 may be used to enable virtual, on-the-fly designs and engineering modifications to mock-ups in real-time, using gesturing in a real-world environment. Its use may thereby simplify, streamline and improve the quality of design work, enhance customer collaboration and buy-in for their products, and reduce costs. In one scenario, for example, a user (e.g., engineer) equipped with the UNU system may walk through a mockup of the interior of an aircraft wearing the AR glasses 204, which may be equipped with or coupled to sensor(s) such as a 3D scanner 206, camera 208 and the like. The camera may be configured to capture gestures of the user. Or in some examples, the UNU system may include one or more additional or alternative sensors configured to capture gestures of the user, such as one or more accelerometers 210 (motion sensors), gyroscopes 212 (orientation sensors), IMUs 214, fiber-optic sensors 216, muscle-activity (e.g., EMG) sensors 218 or the like.

During the walkthrough of the mockup interior, the user may instruct the computer system 202 (e.g., through voice commands, gestures, etc.) to cause the 3D scanner 208 to scan and provide measurements of (or measure) points on the surfaces of objects in the interior. More generally, the 3D scanner may be caused to provide measurements of points on the surface of an object in the user's environment, or slightly more particularly, provide measurements of points on the surface of a mockup of a component of the complex system.

The computer system 202 may receive and process sensed input including the measurements from the 3D scanner 206 to identify a known pattern that indicates a significance of the sensed input from which to identify operations of an appropriate electronic resource. The computer system may form and communicate an input to cause the electronic resource to perform the operations. The input may include the measurements, and the operations may include generation of a point cloud from the measurements, and transformation of the point cloud to an appropriate 3D model (e.g., 3D CAD model) of the interior (or more generally the object in the user's environment). More particularly, for example, the measurements may be input to an appropriate electronic resource that may generate a point cloud, and the same or another electronic resource may then transform the point cloud to an appropriate 3D model of the mockup interior, which may be stored for future use. In various examples, the mockup interior and thus its 3D model may reflect a particular type of seat configuration such as by wire frames, solids, photo-realistic views or the like, and may also reflect other qualities of the mockup interior such as a type of seating, carpet and the like.

Further to the above example scenario, the same or another user equipped with the UNU system 200 may walk through an empty fuselage of an aircraft wearing the AR glasses 204 including a display device 224. In another example, the computer system may be configured to communicate with a projector in addition to or in lieu of AR glasses' display device. During this walkthrough, the user may instruct the computer system 202 (e.g., through voice commands, gestures, etc.) to output the 3D model of the mockup interior for display in life size dimensions. More generally, the UNU system may be configured to receive an output including the including the 3D model from the electronic resource(s), and communicate the output for display by a display device, where the 3D model may be of a component of a complex system.

The AR glasses 204 may generate or otherwise enable a live or direct view of the empty fuselage, which may be augmented by the 3D model of the mockup interior from the computer system 202 of the UNU system 200. More generally, the UNU system may be configured to communicate the output for display in an instance in which the user's environment includes an empty space of the complex system designed for placement of the component, with a live or direct view of the empty space being augmented by the 3D model. In one example, the UNU system may include or be coupled to a plurality of AR glasses that include respective display devices 224 and are worn by respective users walking through the empty fuselage (users in the same environment). In this example, the UNU system may be instructed to output the 3D model to the display device of each of the AR glasses. The 3D model displayed by the respective display devices may be anchored to the empty fuselage (users' environment), but varied for each of the AR glasses depending on viewpoints of the respective users within the fuselage (environment).

The UNU system 200 may further enable a user to make engineering changes to the 3D model of the mockup interior in real-time, which may better assure user requirements are met. In one example, the user equipped with the UNU system may use gestures to alter the displayed 3D model, such as by swiping their hand, pinching, zooming or the like to change the configuration, shape, attitude, orientation, color combination or the like of one or more objects of the mockup interior represented by the 3D model. A user may use gestures to pinch a seat and pull outward to expand it, or swipe to remove it. The gestures may be captured by one or more appropriate sensors 208-218, and provided (as sensed input) to the computer system 202. More generally, an appropriate sensor may be configured to capture a gesture of the user indicating alteration to a portion of the 3D model, and the sensed input may include the captured gesture from the sensor.

The computer system 202 may process the sensed input including the captured gesture, and form and communicate an input to cause an appropriate electronic resource to carry out the alteration indicated by the gesture. The electronic resource may output the altered 3D model or altered objects (e.g., seats) of the 3D model back to the computer system. That is, the output may include at least the altered portion of the 3D model, which may be in turn output to the display device 224 of the AR glasses 204 for display of the 3D model including the altered portion. The alternations may be shown in real-time as they are made, and may be stored by the electronic resource as an iteration or version of the 3D model such as for comparison purposes.

In one example, one or more information models reflecting operation of the aircraft or one or more of its components may be further drawn in to an appropriate electronic resource, which may simulate operation of the aircraft/components. During or after the simulation, the electronic resource may output results of the simulation to the computer system 202, which may in turn output the results to the user through the display device 224 of AR glasses 204. More generally, the UNU system may be configured to receive an output from an electronic resource simulation of operation of the complex system, and communicate the output for display by the display device.

In addition to or in lieu of output of the simulation being displayed, the output may be provided to other user interfaces such as audio output device(s), haptic sensor(s) or the like. The audio output device(s) may provide audible feedback to the user, and the haptic sensor(s) may provide tactile feedback to the user, such as to alert the user of certain events during or as a result of the simulation, and may be provided in addition to or in lieu of visual feedback or other information from the display device 224 of the AR glasses 204. Examples of suitable events may include collisions or other conflicts or interference between components, and may facilitate resolution of such issues.

In some examples, the UNU system 200 may tailor the 3D model and/or other information displayed to a user based on the user's role. That is, the computer system 202 may be configured to communicate the output for display by a plurality of display devices 224 of a respective plurality of AR glasses 204 worn by respective users, with the output for each of the display devices being varied depending on roles of the respective users. In an instance in which a representative of the aircraft manufacturer and a customer are both wearing AR glasses, the computer system may cause the representative's AR glasses to display not only the 3D model but also availability data, be reminded of customer's past preferences or the like, while the customer's AR glasses may display only the 3D model. For more information on a compatible system that may enable viewable information on an as-needed basis, see U.S. patent application Ser. No. 13/005,753, entitled: Augmented Collaboration System, filed Jan. 13, 2011, the content of which is incorporated by reference in its entirety.

During production or post-production of the aircraft, for example, the UNU system 200 may be used to support a number of activities such as build, repair and/or maintenance activities. In various examples, these and similar activities may be performed according to a work plan that formalizes instruction for building, creating or otherwise completing requirements or intention of an engineering design of the aircraft or components of the aircraft. The engineering design may include a set of requirements that indicate specifications, tolerances, purposes, materials or other aspects of the aircraft. The work plan may include a series of work instructions that together comprise a set of directives to be accomplished by worker(s), and each work instruction may include one or more tasks. A task may refer to an action or set of actions to be performed by worker(s) which represents specific and repeatable purposes, motions or actions of the worker(s).

In some examples, a task may be defined to include or imply one or more defined actions of the user to work a complex-system component; and for some tasks, the user may use one or more tools (e.g., hand tools, power tools) to perform the respective actions. For example, the user may be tasked with placing, arranging or assembling components, installing or uninstalling components, drilling a hole in a component, installing a fastener on a component, cutting through or routing out a portion of a component, or the like.

In some examples, a task may have a task definition that includes or implies one or more defined actions of a type that may subject the worker to ergonomic risk, such as lifting, gripping, working overhead, pushing/pulling, bending, kneeling and the like. Lifting may include the worker lifting an amount of weight some number of times. Gripping may include the worker using a grip (e.g., hand grip, pinch grip, finger/thumb press) to apply an amount of force some number of times. Working overhead may include the worker lifting their hands above the head some number of times each of which for an amount of time. Pushing/pulling may include the worker pushing/pulling (e.g., one-handed/two-handed horizontal push/pull, one-armed/two-armed vertical push/pull) with an amount of force some number of times. Bending may include the worker bending their torso forward (e.g., greater than 45°) some number of times each of which for an amount of time. And similarly, kneeling may include the worker kneeling some number of times each of which for an amount of time.

In some examples, a task definition may specify one or more process requirements for a user working a complex-system component, which in some instances may involve use of an appropriate tool (e.g., hand tool, power tool). As suggested above, these may include for example, requirements for the placement, arrangement or assembly of component(s), installation or uninstallation of component(s), drilling of a hole in a component, installation of a fastener on a component, cutting through or routing out a portion of a component, or the like. In a more particular example, a work task for installation of a fastener may include requirements for process variables related to performance of the task such as torque, swag force and/or preload to be applied to the fastener.

In one scenario, for example, a user (e.g., worker) equipped with the UNU system 200 and wearing the AR glasses 204 may enter a work site to carry out defined task(s) of a work plan. The computer system 202 and/or AR glasses may be equipped with or coupled to one or more sensors that may provide sensed input from which the computer system may recognize the user. In some examples, the computer system may cause the camera 208 to capture an image of the user's face, and/or cause the microphone 220 to capture audio of the user, which may be provided to the computer system as sensed input. Or the computer system may cause other physiological-condition sensors to provide sensed input characteristic of the user. The computer system in these examples may be configured to receive and process the sensed input to recognize the user based on facial recognition, voice print or the like. The computer system may further communicate with one or more appropriate electronic resources based on the recognized user, such as to clock the user into work, and/or provide an agenda for the day's work including items such as a daily safety message, any reminders of things to watch for that have been problems in the past, and the like.

As the user prepares to perform a defined task, the sensors may provide sensed input from which the computer system 202 may communicate with appropriate electronic resource (s) to direct the user to where the user may locate required items for performing the task. The computer system may further provide the user with an indication of a known work area for performing the task, and may output to the display device 224 of the AR glasses 204, a route to the respective area. In one example, the computer system may cause the position sensor 222 to provide a measurement of the position of the user, which may be provided to the computer system as sensed input. The computer system may receive and process the sensed input to calculate a route from the user's position to the respective area. As before, in addition to or in lieu of this display device, the computer system may communicate with a projector from which the output may be displayed (the output in either instance augmenting a direct or live view of the user's environment).

The computer system 202 may cause the position sensor 222 to provide measurements tracking the position of the user as the user moves, which may be provided to (as sensed input) and processed by the computer system to determine when the user approaches the work area. The computer system 202 may communicate with appropriate electronic resource(s) to provide reference material or other information relevant to the given task. As the user arrives at or within proximity of the work area, then, the computer system may output the reference material and other relevant information to the display device 224 of the AR glasses 204, such as in a sequential, context-sensitive manner.

While the user is at or within proximity of the work area, computer system 202 may cause the camera 208 to automatically capture images or video of the user and/or their environment, such as from the user's viewpoint. As the user's viewpoint turns to an area of an object with which the user must interact to perform the task, the computer system may receive and process sensed input to recognize the object, communicate with appropriate electronic resource(s) and output visual cues that augment the user's direct view to highlight the respective object. In some examples, the visual cue may have characteristics (e.g., color, shading, pattern, intensity, direction) that may be customized to reflect a status of an object. The computer system may further output step-by-step tasks/actions (visually and/or audibly), and may at various instances output further visual assistance. This visual/audible assistance may include, for example, assistive videos illustrating performance of a task/action, or an animated view of components assembling, perhaps with voice overs that describe the tasks/actions being performed, assistive notes, a rationale behind the tasks/actions or the like.

The user may instruct the computer system 202 (e.g., through voice commands, gestures, etc.) to communicate with appropriate electronic resource(s) to provide information regarding an object of interest, which the computer system may then output to the display device 224 of the AR glasses 204. For example, the user could speak a voice command such as "find flap slat electronics unit," which may be captured by the microphone 220 and processed to cause the computer system to communicate with appropriate electronic resource(s) and output a visual cue that augment the user's direct view to highlight the respective flap slat electronics unit) an LRU). Automatically or in response to user instruction, the computer system may be caused to customize characteristics of the visual cue to reflect the status of the LRU, or provide information regarding the LRU.

As the user performs the task, the computer system 202 may cause various sensors to provide sensed input from which the computer system may track performance of the task. For example, the computer system may cause the camera 208 to automatically capture video to as the user performs the task. Additionally or alternatively, for example, the computer system may cause the accelerometer 210, gyroscope 212, IMU 214, fiber-optic sensor 216, muscle-activity (e.g., EMG) sensor 218 or other appropriate sensor to provide measurements of motion and/or orientation of the user, which may be characteristic of one or more actions of the user. This may include measurements characteristic of the user lifting, gripping, working overhead, pushing/pulling, bending, kneeling and the like. In some examples, the muscle-activity sensor may provide measurements of the user's muscle activity, from which a lifted weight, grip force and/or push/pull force may be calculated.

As or after the computer system 202 tracks performance of a task, the computer system may output the video and/or other sensed input to an appropriate electronic resource for storage and recall, such as for a number of different purposes. For example, the computer system may output the video and/or other sensed input to an electronic resource for performance evaluation purposes. As indicated above, a task may be defined to include or imply defined actions of the user. As also indicated above, the sensed input may include measurements of motion and/or orientation of the user, which may be characteristic of one or more actions of the user. In some examples, then, computer system may output the video and/or other sensed input from which the electronic resource may determine one or more actions of the user during performance of the task, and compare the determined actions to respective defined actions of the task definition. The electronic resource may determine compliance of the user's performance of the task with its definition based on the comparison, which may thereby enable evaluation of the user's performance.

In some examples, the computer system 202 may output the video and/or other sensed input to an electronic resource for ergonomic evaluation purposes. As suggested above, motion and/or orientation of the user may be characteristic of different types of action some of which may subject the worker to ergonomic risk. The computer system may therefore provide the video and/or other sensed input to the electronic resource, which may be configured to perform or facilitate performance of an ergonomic risk assessment based on the video and/or other sensed input. In one example, the ergonomic risk assessment may be performed in a manner similar to that described by U.S. Pat. No. 7,457,678, entitled: Method for Managing Ergonomic Risk Exposure in Manufacturing, issued Nov. 25, 2008, the content of which is incorporated by reference in its entirety.

In some examples, the computer system 202 may output the video and/or other sensed input to an electronic resource for inspection purposes. As suggested above, a task definition may specify process requirement(s) for the user working a complex-system component. For example, a task for installation of a fastener may include requirements for process variables such as torque, swag force and/or preload to be applied to the fastener. In some examples, then, computer system may output the measurements of muscle activity (in addition to or in lieu of video and/or other sensed input) from which the electronic resource may calculate a number of different process variables from the measurements—including torque, swag force and/or preload applied to the fastener by the user (directly or using a tool). The electronic resource may compare the calculated process variables to respective specified process requirements of the task definition. The electronic resource may determine compliance of the calculated process variables with respective specified process requirements based on the comparison, which may thereby enable inspection of task against its process requirements.

An electronic resource may produce and output results of its evaluation or inspection as or after the user performs the task. In instances in which the results are output as the user performs the task, the results may facilitate the user's proper performance of the task, such as according to its definition and specified process requirements. In either instance, however, the results may facilitate the same or another user's proper performance of the same or another task that may depend on the respective task. In some examples, automated recognition of task completion may drive pacer boards, progress dashboards, completion metric software and the like, which may help improve real-time production status.

The electronic resource may produce any of a number of different results of an evaluation or inspection. For example, the electronic resource may produce one or more indications of the determined action of the user, the respective action of the task definition, and/or compliance of the user's performance of the task with its definition based on their comparison. In another example, the electronic resource may produce one or more indications of the calculated process variables (e.g., torque, swag force, preload), respective process requirements specified by the task definition, and/or compliance of the calculated process variables with the respective process requirements based on their comparison. In some examples, the indication of compliance with a task definition or process requirements may be reflected in multiple relative levels that may be distinguished by respective ranges of compliance, such as fully compliant, partially compliant or non-compliant.

In some examples, the electronic resource may output results of the evaluation or inspection to the computer system 202, which may in turn output the results to the user through the display device 224 of AR glasses 204, and/or through other user interfaces (e.g., audio output device, haptic sensor). The results may be output as a numerical or textual feedback. Additionally or alternatively, the results may be output as visual, audible and/or haptic cues that in some instances may reflect a level of compliance to a task definition or process requirement. In the context of fastener installation, for example, the computer system may output a visual cue, audible feedback and/or haptic feedback to the user, such as to alert the user that the calculated process variable (e.g., torque, swag force, preload) is compliant with the specified process requirement.

Evaluation, inspection and other similar operation(s) performed in a manner of example implementations may also enable the user to keep focused on their task instead of waiting for an evaluation, inspection or other process, which may result in a significant time savings, better build quality and/or reduction of cognitive disruption to the user. Moreover, in the event the user takes a break or is otherwise interrupted (e.g., the UNU system 200 experiences a failure), the user's environment may be captured. On returning to the task, the video may be recalled to assist the user returning to the point at which they were interrupted, procedurally with context intact.

Storage of records of tasks including video and other information may enable a number of other processes in addition to or in lieu of those described above. An electronic resource using data analytics may, for example, scan these records looking for aberrations, as well as improvement that may be automatically included in future process-improvement activities. The time each instance of a task is performed may be recorded and output for display in a composite, living "value stream map" that may highlight new areas of opportunity for improvement in various tasks.

The UNU system 200 may further enable the user on-the-fly access to other users (e.g., engineers, planners) via appropriate electronic resources. The user may thereby collaborate with or otherwise receive assistance from others to address a task or problem with the task. During this collaboration, the user may instruct the computer system 202 to provide the other users with contextual or other supporting information that may facilitate their interaction. Even during in service of the aircraft, this may enable collaboration among staff. For example, a flight attendant equipped with the UNU system could speak a voice command such as "I need more coffee" to cause the computer system to communicate with appropriate electronic resource(s) to locate another flight attendant or airline staff nearest the coffee, and output an alert or other indication of the one attendant's need for coffee. The augmented reality system in this scenario may also benefit from aspects of the system disclosed in the aforementioned '753 application.

Moreover, as suggested above, the UNU system 200 may direct a user to where they may locate required items for performing a task. This may include inventoried items, and the computer system 202 may communicate with appropriate electronic resources to perform a variety of activities for inventoried items. Examples of suitable activities include inventory control and auto-reconcile consumption activities, set/reset min/max inventory levels, reorder points and the like, pay for inventory on consumption, and the like. This may synchronize the supply chain to a pull signal of consumption, which may facilitate just-in-time supply. For more information on various min/max aspects, see U.S. Pat. No. 7,769,643, entitled: Min/max Inventory Control System and Associated Method and Computer Program Product, issued Aug. 3, 3010; and U.S. Patent Application Publication No. 2011/0029412, entitled: Apparatus and Method for Controlling Inventory, published Feb. 3, 2011, the contents of both of which are hereby incorporated by reference.

The UNU system 100 (and its example UNU system 200) and method of example implementations may also find use in a variety of other potential applications. The UNU system may have application in information kitting in which the virtual and physical may be combined, such as by augmenting the user's physical environment with virtual information elements at the time and point of use, and in a context-sensitive manner.

In another example, the UNU system 100 of example implementations may have application in accident investigations. In this regard, a point cloud may be recorded and generated from a debris field for analysis that may model differing algorithms to inform an investigation as to which of a myriad of potential events is at the root of the situation at hand.

In yet another example, the UNU system 100 may have application in emotion, user intent/behavior. Gestures, verbal emotional cues, micro expressions and the like may be elements for context. This information may be folded back into contextual information to inform predictive capabilities for need. Engagement may be judged, information and/or a user interface may be updated (provide more help/information), and/or a tie may be made to an available expert (recall what worked last time).

In other examples, the UNU system 100 may have application in virtual guided assistance; and/or mobile, mesh networks, for borrowing computing resources. And in yet another example, the UNU system may have application in human body route tracking, such as to generate an alert if designated work zone has not been entered, or if a dwell time has not met anticipated threshold for a particular operation.

According to example implementations of the present disclosure, the UNU system 100 and resource host systems 108, and their respective subsystems may be implemented by various means. Similarly, the UNU system 200, and examples of a front-end system 300, sensor system 400, analysis system 500, execution system 600 and evaluation system 700, including each of their respective subsystems, elements and the like (e.g., computer system 202), may be implemented by various means according to example implementations. Means for implementing the systems, subsystems and their respective elements may include computer hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wired or wireless network and the like.

Generally, an apparatus of exemplary implementations of the present disclosure may comprise, include or be embodied in one or more fixed or portable, hardware-based electronic devices. Examples of suitable electronic devices include a smartphone, tablet computer, laptop computer, desktop computer, workstation computer, server computer and the like. The apparatus may include one or more of each of a number of components such as, for example, a processor connected to a memory (e.g., storage device).

The processor is generally any piece of computer hardware that is capable of processing information such as, for example, data, computer-readable program code, instructions and the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) and the like. Thus, although the processor may be capable of executing a computer program to perform one or more functions, the processor of various examples may be capable of performing one or more functions without the aid of a computer program.

The memory is generally any piece of computer hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD and the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for transmitting, receiving and/or outputting information. The interfaces may include one or more communications interfaces 104, sensors 106 (e.g., sensors 206-220) and/or user interfaces, examples of which are described above with reference to communications interface 104, sensor 106 and/or user interface (including display device 108—e.g., display device 224).

As indicated above, program code instructions may be stored in memory and executed by a processor to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A ubiquitous natural user system comprising:
   one or more sensors configured to provide sensed input including measurements of at least one of motion or orientation of a user during performance of a task by the user to perform a build, repair or maintenance activity on a complex-system component, the one or more sensors including a muscle-activity sensor configured to provide measurements of muscle activity of the user during performance of the task, the task having a task definition; and
   a front-end system coupled to the one or more sensors, and configured to receive and process the sensed input including the measurements to identify a known pattern that indicates a significance of the sensed input from which to identify operations of an electronic resource,
   wherein the front-end system is configured to form and communicate an input to cause the electronic resource to perform the operations and produce an output, the operations including calculation of a process variable related to performance of the task from the measurements including the measurements of muscle activity, and further including determination of compliance of performance of the task with the task definition based on the calculated process variable, and
   wherein the front-end system is configured to receive the output from the electronic resource, and communicate the output to a display device, audio output device or haptic sensor, including the front-end system being configured to receive and communicate an indication of the compliance.

2. The ubiquitous natural user system of claim 1, wherein the task definition includes or implies a defined action of the user, and
   wherein the front-end system being configured to form and communicate the input includes being configured to form and communicate the input to cause the electronic resource to perform the operations further including determination of an action of the user during performance of the task, and further including comparison of the determined action to the defined action, the determination of compliance of performance of the task with the task definition being based on the comparison.

3. The ubiquitous natural user system of claim 1, wherein the front-end system being configured to form and communicate the input includes being configured to form and communicate the input or another input to cause the electronic resource or another electronic resource to perform or facilitate performance of an ergonomic risk assessment based on the sensed input.

4. The ubiquitous natural user system of claim 1, wherein the task definition specifies a process requirement for the process variable that includes a torque, swag force or preload applied to a fastener during performance of the task including installation of the fastener on the complex-system component, and
   wherein the front-end system being configured to form and communicate the input includes being configured to form and communicate the input to cause the electronic resource to perform the operations including calculation of the process variable, the calculation including the torque, swag force or preload applied to the fastener by the user as determined from the measurements of muscle activity, and the operations further including comparison of the calculated process variable to the specified process requirement, the determination of compliance of performance of the task with the task definition including determination of compliance of the calculated process variable with the specified process requirement based on the comparison.

5. The ubiquitous natural user system of claim 4, wherein the front-end system being configured to receive and communicate the indication of the compliance includes being configured receive and communicate a visual cue, audible feedback or haptic feedback to alert the user that the calculated process variable is compliant with the specified process requirement.

6. The ubiquitous natural user system of claim 1, wherein the front-end system being configured to communicate the output includes being configured to communicate the output for display by a personal display system that includes the display device, the personal display system being configured to generate or enable a live or direct view of the environment, augmented by the output displayed by the display device.

7. A method comprising:
providing by one or more sensors, sensed input including measurements of at least one of motion or orientation of a user during performance of a task by the user to perform a build, repair or maintenance activity on a complex-system component, the one or more sensors including a muscle-activity sensor configured to provide measurements of muscle activity of the user during performance of the task, the task having a task definition;
receiving and processing the sensed input including the measurements to identify a known pattern that indicates a significance of the sensed input from which to identify operations of an electronic resource;
forming and communicating an input to cause the electronic resource to perform the operations and produce an output, the operations including calculation of a process variable related to performance of the task from the measurements including the measurements of muscle activity, and further including determination of compliance of performance of the task with the task definition based on the calculated process variable; and
receiving the output from the electronic resource, and communicating the output to a display device, audio output device or haptic sensor, including receiving and communicating an indication of the compliance.

8. The method of claim 7, wherein the task definition includes or implies a defined action of the user, and
wherein forming and communicating the input includes forming and communicating the input to cause the electronic resource to perform the operations further including determination of an action of the user during performance of the task, and further including comparison of the determined action to the defined action, the determination of compliance of performance of the task with the task definition being based on the comparison.

9. The method of claim 7, wherein forming and communicating the input includes forming and communicating the input or another input to cause the electronic resource or another electronic resource to perform or facilitate performance of an ergonomic risk assessment based on the sensed input.

10. The method of claim 7, wherein the task definition specifies a process requirement for the process variable that includes a torque, swag force or preload applied to a fastener during performance of the task including installation of the fastener on the complex-system component, and
wherein forming and communicating the input includes forming and communicating the input to cause the electronic resource to perform the operations including calculation of the process variable, the calculation including the torque, swag force or preload applied to the fastener by the user as determined from the measurements of muscle activity, and the operations further including comparison of the calculated process variable to the specified process requirement, determination of compliance of performance of the task with the task definition including determination of compliance of the calculated process variable with the specified process requirement based on the comparison.

11. The method of claim 10, wherein receiving and communicating the indication of the compliance includes receiving and communicating a visual cue, audible feedback or haptic feedback to alert the user that the calculated process variable is compliant with the specified process requirement.

12. The method of claim 7, wherein communicating the output includes communicating the output for display by a personal display system that includes the display device, the personal display system being configured to generate or enable a live or direct view of the environment, augmented by the output displayed by the display device.

13. A computer-readable storage medium that is non-transitory and has computer-readable program code stored therein that, in response to execution by a processor, cause an apparatus to at least:
receive from one or more sensors, sensed input including measurements of at least one of motion or orientation of a user during performance of a task by the user to perform a build, repair or maintenance activity on a complex-system component, the one or more sensors including a muscle-activity sensor configured to provide measurements of muscle activity of the user during performance of the task, the task having a task definition;
process the sensed input including the measurements to identify a known pattern that indicates a significance of the sensed input from which to identify operations of an electronic resource;
form and communicate an input to cause the electronic resource to perform the operations and produce an output, the operations including calculation of a process variable related to performance of the task from the measurements including the measurements of muscle activity, and further including determination of compliance of performance of the task with the task definition based on the calculated process variable; and
receive the output from the electronic resource, and communicate the output to a display device, audio output device or haptic sensor, including the apparatus being caused to receive and communicate an indication of the compliance.

14. The computer-readable storage medium of claim 13, wherein the task definition includes or implies a defined action of the user, and
wherein the apparatus being caused to form and communicate the input includes being caused to form and communicate the input to cause the electronic resource to perform the operations further including determination of an action of the user during performance of the task, and further including comparison of the determined action to the defined action, the determination of compliance of performance of the task with the task definition being based on the comparison.

15. The computer-readable storage medium of claim 13, wherein the apparatus being caused to form and communicate the input includes being caused to form and communicate the input or another input to cause the electronic resource or another electronic resource to perform or facilitate performance of an ergonomic risk assessment based on the sensed input.

16. The computer-readable storage medium of claim 13, wherein the task definition specifies a process requirement for the process variable that includes a torque, swag force or preload applied to a fastener during performance of the task including installation of the fastener on the complex-system component, and wherein the apparatus being caused to form and communicate the input includes being caused to form and communicate the input to cause the electronic resource to perform the operations including calculation of the process variable, the calculation including the torque, swag force or preload applied to the fastener by the user as determined from the measurements of muscle activity, and the operations further including comparison of the calculated process variable to the specified process requirement, the determination of compliance of performance of the task with the task definition including determination of compliance of the calculated process variable with the specified process requirement based on the comparison.

17. The computer-readable storage medium of claim 16, wherein the apparatus being caused to receive and communicate the indication of the compliance includes being caused receive and communicate a visual cue, audible feedback or haptic feedback to alert the user that the calculated process variable is compliant with the specified process requirement.

18. The computer-readable storage medium of claim 13, wherein the apparatus being caused to communicate the output includes being caused to communicate the output for display by a personal display system that includes the display device, the personal display system being configured to generate or enable a live or direct view of the environment, augmented by the output displayed by the display device.

* * * * *